(12) United States Patent
O'Kane

(10) Patent No.: US 8,234,165 B2
(45) Date of Patent: Jul. 31, 2012

(54) DIGITAL TUNER REGULATOR PLATFORM (DTR)

(75) Inventor: Robert C O'Kane, Stuart, FL (US)

(73) Assignee: Funn Holdings LLC, West Palm Beach, FL (US)

(*) Notice: Subject to any disclaimer, the term of this patent is extended or adjusted under 35 U.S.C. 154(b) by 1287 days.

(21) Appl. No.: 10/604,974

(22) Filed: Oct. 29, 2003

(65) Prior Publication Data

US 2006/0075445 A1   Apr. 6, 2006

(51) Int. Cl.
*G06Q 30/00* (2012.01)
*H04N 7/16* (2006.01)
*H04N 7/10* (2006.01)
*H04N 9/00* (2006.01)
*G06F 3/00* (2006.01)
*G06F 21/00* (2006.01)

(52) U.S. Cl. ........... 705/14.53; 725/22; 725/25; 725/32; 725/42; 725/9; 705/14.4; 705/14.55; 705/14.66; 705/14.69; 713/182; 726/2

(58) Field of Classification Search .................. 725/112, 725/9, 22, 25, 32, 42; 705/14.4, 14.53, 14.55, 705/14.66, 14.69; 713/182; 726/2
See application file for complete search history.

(56) References Cited

U.S. PATENT DOCUMENTS

| | | | | |
|---|---|---|---|---|
| 5,931,908 A * | 8/1999 | Gerba et al. | ................. | 709/219 |
| 6,029,045 A * | 2/2000 | Picco et al. | ..................... | 725/34 |
| 6,434,535 B1 * | 8/2002 | Kupka et al. | ..................... | 705/24 |
| 6,571,392 B1 * | 5/2003 | Zigmond et al. | ............. | 725/110 |
| 6,721,958 B1 * | 4/2004 | Dureau | .......................... | 725/136 |
| 2002/0035533 A1 * | 3/2002 | Mache et al. | .................... | 705/37 |
| 2002/0092015 A1 * | 7/2002 | Sprunk et al. | .................... | 725/9 |
| 2003/0066091 A1 * | 4/2003 | Lord et al. | ..................... | 725/135 |
| 2003/0145331 A1 * | 7/2003 | Escobar et al. | ............... | 725/110 |
| 2003/0229900 A1 * | 12/2003 | Reisman | ........................ | 725/87 |

FOREIGN PATENT DOCUMENTS

WO        WO02-39340        *   5/2002

* cited by examiner

*Primary Examiner* — Hoang-Vu A Nguyen-Ba
(74) *Attorney, Agent, or Firm* — Jeffrey M. Furr, Esq.; Furr Law Firm

(57) ABSTRACT

The current invention allows the distribution of content material to and from digital tuner. The advertising medium also provides royalty to the content material owners for the users "use" of content.

11 Claims, 1 Drawing Sheet

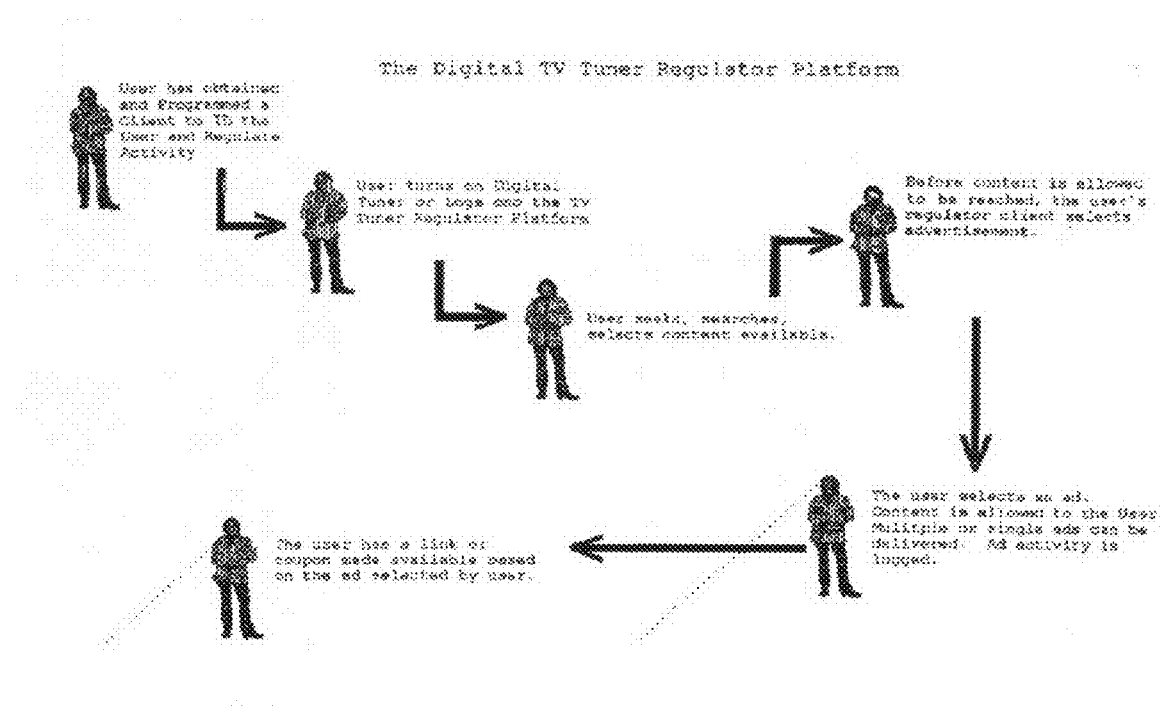

DIGITAL TUNER REGULATOR PLATFORM (DTR)

BACKGROUND OF INVENTION

The convergence of TV and the Internet has arrived. "Digital Tuners" has also surfaced thanks to technological advances over the last 10 years. This patent application provides key insight into how this technology operates and performs many unique processes that when combined, provides for the technology or parts of it to work together or as a stand alone that will help TV broadcasters and content owners regulate their content. This technology provides a way to deliver digital media, chat, email, art, software, gaming, multi media, actual television broadcasting content, cable television content and web page based content over digital tuner equipped television sets and devices of the future. Strategy Analytics reports that people world will have access to online services and content delivered via their TV sets by 2005. That number is expected to increase dramatically now the FCC has mandated that Digital Tuner be manufactured with ALL TV sets by 2007.

The Digital TV Tuner Regulator Platform invention would provide a unique authentication process that identifies, tracks, aggregates and records the information as it relates to content, users and advertisements users actually choose. The up coming void in this marketplace that has to be filled for a truly independent system that provides all of the above. This technology offers broadcaster and content providers a way to broadcast or deliver content and derive revenues from the use of the Digital Tuner Regulator Platform. This invention provides numerous stand alone or work together processes that control and audit user activity, digital media content distribution and royalty distribution for use of the digital media. As well as that consumers are actually able to select their own viewing choices. Commercials are intended to act as the user's contribution or payment to view content. A system must be in place to handle 625 million television users/multiple users.

The DTR provides a way for TV Broadcaster's, content owners and Advertisers interact with their audience that uses Digital Tuner equipped TV's.

Again this is important because new method must be in place to assure content owners protection from theft and piracy of content as seen in the music and video industries the past three years.

In a Cnet article dated August 9th, they reported that: As of August, 2002, all future tv sets sold in the United States must include digital receivers. In an attempt to spur the adoption of digital TV, the Federal Communications Commission voted that all new TV sets to include digital receivers by 2007 which allow for consumers to access the Internet and exchange and use content. Beginning Jul. 1, 2004, TV sets with screen sizes of 36 inches and larger must include digital receivers. By 2007, it must be in all TV's.

The Digital Tuner is a way for broadcasters to deliver their content (old and new) to consumers safely and effectively while being compensated in a truly UNIQUE way. The Digital Tuner Regulator Platform will provide, for example, for the TV industry both accountability for users and content alike while assuring they will be able to generate revenues as they do today. The Digital Tuner Regulator Platform also provides an overall process that prevents pirating and/or the copying of content.

This is important as the FCC "pushed" for techniques to deliver a way to prevent copying of digital TV based broadcasts. FCC also noted that all digital TV transmissions will include a "broadcast flag" which designates shows that may not be copied freely. This "flag" is merely another Digital Rights Management tool but only for TV. Digital Rights Management induced files limit the use of a file. The Digital Tuner Regulator Platform IS NOT a digital rights management tool. The Digital Tuner Regulator Platform does not alter or manipulate the actual content "file" that a user receives, downloads or uses.

All televisions would be required to recognize the flag and, if it is present, permit consumers to record broadcasts only in lower-quality analog or encrypted digital formats. The Digital Tuner Regulator Platform invention also allows for a way to track these flags and account for each of them so they are not distributed in violation of copyright laws. This is a major concern for the FCC and the TV industry for they fear a Napster type situation could strangle the TV worlds. Napster in the late 1990's and early 2000 allowed for a distribution platform where people infused, transferred, played and distributed copyrighted materials causing irreparable harm to the music world.

SUMMARY

The DTR invention is consumer friendly allowing them to distribute content legally, in some cases free for the advertising medium provides royalty to the content owners for the users "use" of content. Since the FCC mandates, numerous consumer groups have criticized what the FCC is doing saying it could limit traditional fair use rights. The DTR invention is designed to make consumers happy while making the content owners happy.

The invention solves the concerns of content owners following problems that are arising currently exist with content file sharing networks:

Content Owner's demand downloads and usage activity reports. They otherwise have no way to audit the material for use and royalty.

Content Owner's do not have control over the amount of downloads and or time the file has been "shared", "used" and "re-produced illegally."

Content Owner's lack profit. In short, they continue to lose revenue since the proliferation of the Internet ten years ago.

BRIEF DESCRIPTION OF DRAWINGS

FIG. 1—Shows the system

PREFERRED EMBODIMENT

This invention, when put in motion with combined processes or in a stand alone modes by way of software induced Regulators regulate content distribution infrastructures as it relates to Digital Tuner Equipped TV's, devices and supporting technologies. The Digital Tuner Regulator Platform invention regulates users, content and royalty generating advertisements that users. The infrastructure built around The Digital Tuner Regulator Platform also allows for advertisers and content owners to upload, download and delete content at will while at the same time able to view vital up to date statistics regarding the content and ad use, the key vital demographic information to determine future campaigns. The Digital TV Tuner Regulator Platform invention is also a real time, 100% factual information, unlike the "Neilson Ratings." The Digital Tuner Regulator Platform has a main user database (or information storage unit) in which all users have unique Digital TV Tuner Regulator Platform clients. This is a database comprised of users each with unique The Digital Tuner Regulator Platform Client.

The Digital Tuner Regulator Platform regulates and act differently for each profile a user creates, is 100% different from the rest of the users. Each user is unique and authenticated. Each user can update their profiles up to the minute or daily thanks to the Digital Tuner Regulator Platform and It's Client. The Digital Tuner Regulator Platform Client is either assigned, downloaded, or pre-installed on TV's that are made equipped with a Digital TV Tuner. Please note: This is not limited to content owners or ADMINISTRATORS of the Digital Tuner Regulator Platform. i.e.: TV's that receive content through a UHF reception, cable tv box, or a satellite box first before the content "signals" reach the TV.

The Regulator Client represents each unique user. Each client is "programmed" with input based on the users personal preferences, demographics, desires, age, of each user and more. Once the Digital Tuner Regulator Platform is programmed with each unique users "Client" the client then performs certain tasks that provide for a unique platform to allow users to trade, exchange, and "use" content.

The platform has processes that allow content owners (i.e.: television broadcasters, content owners) complete control over content distribution and royalties in the digital age. The Digital Tuner Regulator Platform Client is responsible for updating the main platform, regulating the content requested, played, or exchanged. The Digital Tuner Regulator Platform Client is also responsible for providing advertisements to the user so the user may select his or her own advertisement based on the personal preferences they program each of their Clients with. The user in short is capable select which advertisements they desire to see in exchange for content "use". The platform provides a way to calculate, distribute and pay royalties in real-time (or not). The revenues for "use" are derived from "paid" advertisements.

The Digital Client regulates the information accumulated throughout the users any given moment of activity and is constantly sending this information back to the Digital Tuner Regulator Platform where it is organized and audited for real time information to those that need it. Content owners have complete control of their content and whether or not they desire to make it available to users, which would not be in their advantage for they will lose revenues they could be making. They can also designate the people they want the content to go based on The Digital Tuner Regulator Platform Client that recognizes the users "age", preferences and demographic locations. The same applies for participating advertisers. Advertisers can limit ad's to children or adults, as well as restrictions on content that the advertisements are played for. (contract disputes, users imagined perception that the advertiser "supports" the content.) The Digital Tuner Regulator Platform is very flexible. It can also recognize and accept credit card payment, check payments, and allow for the real time auditing of a users purchase history. The Digital Tuner Regulator Platform keeps track of the activity of the user (select/or not select content, select or not select ad's, and play or store content) and reports this information to the Digital Tuner Regulator Platform. The Digital Tuner Regulator Platform Client can be installed on either the users TV (or cable box, satellite box, UHF, VHF and TV computer's with equipped hard drives or the both the users TV (or computer that provides TV content. i.e.: audio or video) and the entity that uses digital tuners on the back end for user interactivity. The Digital Tuner Regulator Platform Client regulates the processes that make up this invention. (s) The Digital Tuner Regulator Platform processes work together (OR STAND ALONE) to authenticate users, content, advertisement, and royalty distribution to keep consumers, content owners and advertisers happy. The Digital Tuner Regulator Platform works with all current and future platforms that distribute content. The Digital Tuner Regulator recognizes reports back to the Digital Tuner Regulator Platform the user, the times of user activity, content type (audio, video, gaming, art, live broadcast, streamed broadcast, etc), name of the content, when it was entered or made available to users by the content owners themselves, the amount of times content has been used or transferred, the advertisement options, what advertisement the viewer has or has not selected in the past, the amount of royalties paid for and to whom they were paid. This is the users "path" through this platform.

The Digital Tuner Regulator Client is also able to read and recognize if a person who uses a digital tuner equipped device or TV platform is equipped with a The Digital Tuner Regulator Platform Client. In short, The Digital Tuner Regulator Platform actually recognizes or will know if a TV, hard drive, or storage unit requesting content has been equipped with it's own unique Regulator Client. This allows for the user TO request, use or even exchange content to others that have a unique Client installed in either in a Digital TV Tuner or another digital tuner equipped device. If not equipped with a Client, The Digital V Tuner Regulator Platform Client blocks the content being distributed to the other user (Client). The Digital Tuner Regulator Platform Client then is capable of sending the user who does not have a The Digital Tuner Regulator Platform assigned Client or with a digital tuner to a designated area to get The Digital Tuner Regulator on their TV or other digital tuner equipped devices.

Content owners may insert content which is Digital Rights Management Protected based or non-protected files. Content could be in the form of new and old tv shows, video's, live broadcasts, art, pictures, conferencing, interactive tv, gaming, music video's, etc. The invention allows for the content owners to provide their entire digital libraries to users for the invention guarantees the content owners will be paid for the users "use" of content. The Digital Tuner Regulator Platform regulates searches of content (content search engine) distribution, accounts for it, and audits it all at the same time. (or not) The content source could be provided via many existing platforms which may have patent related to them. P2P, Internet Streaming, Data casting Platforms, etc. The Digital Tuner Regulator Platform works with existing digital media or content platforms. The Digital Tuner Regulator Platform regulator regulates content distribution before, during and after the content reaches the actual Digital Tuner equipped TV or device. It can regulate unlimited forms of content interaction from the point the content reaches the tuner, and when the user "uses" the content (multiple shows showing at once, etc).

The Digital Tuner Regulator Client invention can select content from various sources at once and in tandem with other The Digital Tuner Regulator Platform Clients. When the user activates his or her own unique Regulator Client, the content server is locked into each Regulator Client that is active so the user may be able to access content. Two main sources the content will be available from: a) It could work all "in-house" with a content delivery platform already assembled that a user with a Regulator Client has access to. (see FIG. 1.) b) Or, for example, if an entity desires use of the Digital Tuner Regulator Platform Client Technology to regulate their own content already existing on other technological platforms, a "Regulator Platform" bridge or "api" will be installed in between the DTR technology and the content available to those users with unique regulator clients. Advertisements (any shape or form. video, audio, animated, banner, etc) play in lieu of content usage, so the advertisements can play before, during or after the actual content reaches the Digital Tuner equipped TV or device. In short, the user must still select an advertisement or pay for the content before the content is played in part, or in full when delivered to the end user. A user payment can or can't be in combination of the actual advertisement selection by the end user. Content is always accounted for. A content file is never allowed access to an end user's digital tuner equipped device or TV Tuner unless a payment is registered by way of advertisement or payment or combined. Digital Tuner Regulator Platform also logs and reports all this information.

Content owners will be able to insert in real time, via the internet or any other electronic device, content into a The Digital Tuner Regulator Platform regulated content server at will. Content owners upon access to the Digital Tuner Regulator Platform can or can't set usage royalty (advertisement) rates. The Tuner Regulator Platform shall audit all the information the content owner needs to regulate and profit from content use. Content owners upon access to the Digital Tuner Regulator Platform users can view in real time the usage of each of their respective content offerings. Daily, up to the minute, monthly, year to date as well as how much money has been paid in royalties for the use of their content. They can also view how many "unique" files they have made available to users. This includes the title or name of the content.

The demand for better advertising has been going on for years. The Digital TV Tuner Regulator Platform provides processes and control the advertiser never had before in any other technological invention. It is user friendly and it's popularity will soar is knowing that people feel commercials are a fair price to pay for content "use."

Each users Digital Tuner Regulator Platform Client can pre-programmed preferences (all preferences are stored in the client database or storage unit) that the user programmed his or her The Digital Tuner Regulator Platform Client so The Digital Tuner Regulator Platform can regulate and deliver choice of advertisements or stand alone advertisements based on those same users preferences. Never before has the advertiser had an opportunity such as this to reach their audience. Advertisements that are selected by the user before, after, or during the time a user requests content. The user shall have the choice to pick which ad selections they desire from any number of options of actual advertisements or stand alone advertisements.

The DTR is very powerful and provides a broad range of service for its users and participating advertisers. For example, it recognizes and reports to the Digital Tuner Regulator Platform advertisements that are new or old and is able to determine if a user has or has not viewed or listened to a specific advertisement. They have control of their actual ad campaigns. The Digital Tuner Regulator Platform Client will only allow or pre select advertisements that the user has not viewed or listened to or what the user basically tells it to do. For example, The Digital Tuner Regulator Platform invention allows the user to program his The Digital Tuner Regulator Platform Client to accept or not accept advertisements already viewed by the user or a specific type of advertisement. (i.e.: parents do not want adult advertisement reaching their children so the Digital Tuner Regulator Platform does not allow these types of commercials to even be seen, or pre-selected) The Digital Tuner Regulator Platform Client acknowledges when the advertisement is played, allowing the content to be received by the user (downloaded, uploaded). The Digital Tuner Regulator Platform Client acknowledges if content is in "full" or broken into numerous parts, segments or digital chunks. The Digital Tuner Regulator Platform Client is capable of recognizing where commercials are to be added or deleted before, during or after the content download. The Digital Tuner Regulator Platform Client also can provide advertisement inserts if the user of the Digital Tuner Regulator Platform Client is active, the TV or other tuner equipped device is "on", and if the same user is either playing, transferring, or exchanging content or performing, for example, real time conferencing. Once an advertisement is played in it's entirety (or before), royalty payment is audited, logged and reported by the Digital Tuner Regulator Platform Client to the Digital Tuner Regulator Platform for auditing purposes and content is "used" by users for it is "paid for" but that does not limit the Digital Tuner Regulator Platform from sending more advertisements in the background that will not effect the use of the content.

The Tuner Regulator Platform technology will ALSO deliver a special notice regarding the advertisement the user just viewed to a designated memory area either in the TV or TV storage unit or hard drive owned by the user. This is delivered as soon as the ad is played. When the ad is finished the Client reports back to the advertisement storage unit so this link or coupon can be sent to the user based on a specific product or service offered in the advertisement the user selected. if the user does not have a TV equipped storage unit, it can be sent via email for example. The coupon is sent to the TV Tuner (computer TV—or any other applicable device that is capable of storing coupons or computerized links) storage unit, where applicable, for the user to use the coupon to shop online, or at brick and mortar storefronts. Direct response medium could never be more "direct." In short, if the user selects content, then selects an ad, that ad could be a pizza advertisement in which the user then can, for example, call the pizza store, order a pizza, and provide a coupon to the delivery boy for a cheaper price.

Advertisers can view how many advertisements they have in the system, view in real time the amount of times advertisements are viewed, the time, date, etc, view in real time the content that the user actually selected in order for the actual advertisements to be played, where (demographically) the advertisements were played, what were least or most popular advertisements with users, add money to their respective accounts to assure advertisements run consecutively w/o interruption of service, regulate what user will be able to view as far as advertisements. (age, race and demographic preferences, etc) They may even set which desired rate they desire to pay, or to "bid" for placement of an advertisement with other advertisers. For example, if a new TV show is out, or video is on the streets, and the Digital Tuner Regulator Platform ADMINISTRATOR knows there will be a consumer demand, can set up a bidding atmosphere where advertisers bid to place their respective advertisements on the front line when the consumer actually selects or demands the content which is the form of a new TV show or video (examples).

The Digital Tuner Regulator Platform Client, again, is programmed by each individual user's preferences, and THAT includes language preferences. If a user prefers, for example, advertisements in Spanish, the advertisement server shall provide a Spanish advertisement instead of the advertisement being in, for example, English. Advertisers upon access can upload or download specific advertisements which allows for advertisers to keep up with specific ad campaigns.

The Advertiser can also control ad impression preferences and how they desire the user or solicit the user. They are however, assured that their advertisement will be viewed before, during or after the content reaches the end user. There is not a limit to the type of advertisements they can use. The advertisement server will "code" or designate, or assign a code for each respective advertisement (and associating coupons) uploaded to the Digital Tuner Regulator Platform by a participating advertiser. Advertisement fees are also immediately deducted from the participating advertisers account when an advertisement is played and the Trigger logs the advertisement "selection and/or use." The Digital Tuner Regulator Platform Client reports, accounts and audits this information in real time.

The Digital Tuner Regulator Platform audits and accumulates all the information activities from which each unique Client (user.). Frequency of use, times and dates. The auditing component/process begins to audit each user when the user "logs" in or activates his or her unique "client" for the first time. That means they turned their Digital Tuner equipped TV or device on.

The auditing information provided by the Digital Tuner Regulator Platform's "Client" that is assigned to all users is also accounted for. It audits requested content for each unique user, audits the owners of the requested content, audits the demographics of each "client" user that requests content, the date, time and frequency of content requested per "client", audits the information regarding the users platform used to receive, audits downloaded or uploaded the content, audits the use of each respective content type and the form the content is delivered, the amount of transfers, exchanges and downloads of content, accounts for each users advertising preferences to help the Digital Tuner Regulator Platform deliver preferred advertisements, audits the actual advertisements played, audits the amount of unique "user" views for each respective advertisement, audits the owners of the advertisements who participate in this advertising invention, audits the demographics of each advertiser and their specific user "audience", audits the date, time and frequency of USE of EACH unique advertisement, audits the users use of coupons provided by the advertising server, audits the information regarding the royalties paid or accumulated and paid, audits the respective advertisement type (audio, image, banner, video, animation, etc), accumulates royalties and prepares for the distribution of royalties, stores payment activity of each specific content owner, is capable of preparing federal and state tax forms as it relates to reporting royalty revenues to the proper government authorities, is capable of printing checks for the fulfillment royalty distribution and is capable of connect itself with content owner banking accounts to allow for secure transfer of funds for the fulfillment royalty distribution.

This current invention has a rating system as well. Current TV broadcasters and content owners measure success by way of Neilson Ratings©, which rate the popularity of a TV show in a given week. The only flaw with these rating is that the people reviewing them are not assured that somebody is actually watching a show (content). Some may be out shopping with the TV on, or some may be cooking. This is how TV Broadcasters determine their advertising fees in which the broadcaster derive their income. The Digital Tuner Regulator Platform invention is big for it provides "100%" true accurate numbers that reflect exactly how many times content has indeed been watched. No assumptions.

Embodiment Number 1

The Tuner Platform has a main user database (or information storage unit) This is a database of users each with unique The Digital TV Tuner Regulator Platform Client. The Digital TV Tuner Regulator Platform Client regulate and act differently for each profile a user creates, is 100% different from the rest of the users. Each user is unique and authenticated. Each user can update their profiles up to the minute or daily thanks to the The Digital TV Tuner Regulator Platform and It's Client.

Embodiment Number 2

The Tuner Platform Client is either assigned, downloaded, or pre installed on TV's that are made equipped with a Digital TV Tuner. This is not limited to TV's that receive content through a cable tv box, a satellite box first before the content "signals" reach the TV. Each The Digital TV Tuner Regulator Platform Client is then "programmed" with input based on personal preferences, demographics, desires, age, of each user and more. Once the Digital TV Tuner Regulator Platform is programmed with each unique users "Client" the Digital TV Tuner Regulator Platform is assigns each unique user with their own "Client" which then regulates processes, for which this is invention is made.

Embodiment Number 3

The Tuner Platform Client is "activated" only when a user turns on the TV, or opens up the software for use containing the unique The Digital TV Tuner Regulator Platform Client. The user's "use" is when the user desires to receive, download, play or exchange content.

Embodiment Number 4

The Tuner Platform Client is responsible for regulating the content requested. The Digital TV Tuner Regulator Platform Client is also responsible for providing advertisements to the user so the user may select his or her own advertisement based on the preferences they program each trigger with and at the same time accounting for the royalty fulfillment for the use of the content.

Embodiment Number 5

The Tuner Platform Client regulates the information accumulated throughout the users any given moment of activity. (see below "auditing server")

Embodiment Number 6

The Digital TV Tuner Regulator Platform Client recognizes the "age" of a user, thus prohibiting the user, if under legal age, access to content that is meant for adults, or over a certain age.

Embodiment Number 7

The Tuner Platform Client works within a secure atmosphere. All content requests, transfers, advertisement requests and deliverables, as well as royalty distribution all occurs within this closed matrix.

Embodiment Number 8

The Tuner Platform Client components can also recognize and accept credit card payment, check payments, and allow for the real time auditing of a users activity and purchase history. The Digital Tuner Regulator Platform Client keeps track of the activity of the user and reports this information to the numerous components that drive this invention.

Embodiment Number 9

The Tuner Platform Client can be installed on either the users TV (or computer that provides TV content. i.e.: audio or video) or the both the users TV (or computer that provides TV content. i.e.: audio or video) and the entity that uses the trigger technology on the back end for user interactivity. The Digital TV Tuner Regulator Platform Client regulates the processes that make up this invention.(s) The Digital TV Tuner Regulator Platform processes must work together (OR STAND ALONE) to authenticate users, content, advertisement, and royalty distribution.

Embodiment Number 10

The Tuner Platform works with all current and future platforms that distribute content. The Digital TV Tuner Regulator Platform Client recognizes reports back to the Digital TV Tuner Regulator Platform the user, the times of user activity, content type (audio, video, gaming, art, live broadcast, streamed broadcast, etc), name of the content, when it was entered or made available to users, the amount of times content has been used or transferred, the advertisement options, what advertisement the viewer has or has not selected to view in order to not send the user "repeat" advertisements, the amount of royalties paid for the users "use" of content, etc.

Embodiment Number 11

TV Tuner Platform Client is able to read and recognize if a person or TV platform is equipped with a The Digital TV Tuner Regulator Platform Client receiver or device. The technological platform that the Digital TV Tuner Regulator Platform Client regulates for is one where the Digital TV Tuner Regulator Platform Client will know if a TV, hard drive, or storage unit has been equipped with it's own unique The Digital TV Tuner Regulator Platform Client. This allows for user TO user content distribution or server content based distribution platforms. If the other does not a Digital TV Tuner equipped TV, The Digital TV Tuner Regulator Platform Client blocks the content being distributed to the other user. The Digital TV Tuner Regulator Platform Client then is capable of sending the person who does not have a TV equipped with a digital tuner to a designated area to get a The Digital TV Tuner Regulator Platform Client and be part of the Digital TV Tuner Regulator Platform.

Embodiment Number 12

The Tuner Platform Client can also regulated by the content owners. Content owners "program" the trigger to users that will still allow content to be used or made available to users with The Digital TV Tuner Regulator Platform Clients. Likewise, The Digital TV Tuner Regulator Platform Client also recognizes when a content owner does desire specific content to be used by other The Digital TV Tuner Regulator Platform users. Content owners also have the ability to block advertisements they do not desire to be "associated" with their content.

Embodiment Number 13

The content sourced as soon as a user activates his or her The Digital TV Tuner Regulator Platform Client.

Embodiment Number 14

The Tuner Platform Technology does NOT regulate the "tuner to the users with a unique trigger. Content owners may insert content which is Digital Rights Management based or non-protected files. (files embedded with codes or "instructions" that cover actual usage, etc.) They may make available content with just an advertisement(s) for payment for use of content or they may desire advertisement(s) and payment for the use of content. Content could be in the form of new and old tv shows, video's, live broadcasts, art, pictures, conferencing, interactive tv, gaming, music, etc.

Embodiment Number 15

The source provided via many existing platforms. The Digital TV Tuner Regulator Platform plug's into existing digital media. From existing peer to peer platforms made for Digital Tuner TV, TV's or Computer TV's and TV/Computer Storage Units, "Streaming" Platforms made for TV or Computer TV's and TV/Computer Storage Units, Live Broadcast Platforms made for TV or Computer TV's and TV/Computer Storage Units, Wireless Platforms (in any shape. i.e.: peer to peer), UHF/VHF Platforms made for TV's or Computer TV's and TV/Computer Storage Units, Satellite and Cable Company Platforms/Boxes made for TV or Computer TV's and TV/Computer Storage Units.(explained more below in alternative embodiments)

Embodiment Number 16

To "begin" transporting to the end user until the end user selects an advertisement to view to begin transfer of content to the users TV platform, or storage unit for later use of the actual content. Advertisement can or can't be played during and after advertisement selection has transpired. In short, the user must select an advertisement or pay for the content before the content is delivered to the end user. The payment can or can't be in combination of the actual advertisement selection by the end user. Content is always accounted for. A content file is never allowed access to a end user unless a payment is registered by way of advertisement or payment or combined. Digital TV Tuner Regulator Platform Client logs and reports all this information.

Embodiment Number 17

The Tuner Platform Client invention can select content from various sources at once and in tandem with other The Digital TV Tuner Regulator Platform Clients. When the user activates his or her own unique Regulator Client, the content server is locked into each Regulator Client that is active so the user may be able to access content. Two main sources the content will be available from. A) It could work all "in-house" with a content delivery platform already assembled that a user with a Regulator Client" has access to. (see FIG. 2) b) Or, for example, if an entity desires use of the Digital TV Tuner Regulator Platform Client Technology to regulate their own content already existing on other technological platforms, a "Regulator Platform" bridge will be installed in between the trigger technology and the content available to those users with triggers. (see FIG. 1)

Embodiment Number 18

Content owners upon access to the content storage unit will be able to insert in real time, via the internet or any other electronic device, content into a The Digital TV Tuner Regulator Platform regulated content server at will.

Embodiment Number 19

The Digital TV Tuner Regulator Platform storage unit can also eliminate the availability of content to people.

Embodiment Number 20

The content storage unit can or can't set usage rates for the content.

Embodiment Number 21

The content storage unit can or can't set usage advertisements rates. The TV Tuner Regulator Platform Client shall audit all the information the content owner needs to regulate and profit from content use.

Embodiment Number 22

The content storage unit can view in real time the usage of each of their respective content offerings. Daily, up to the minute, monthly, year to date.

Embodiment Number 23

The content storage unit can view how much money has been paid in royalties for the use of their content.

Embodiment Number 24

The content storage unit can view how many "unique" files they have made available to users. This includes the title or name of the content, etc.

Embodiment Number 25

The numerous servers or components that are combined together in various separate locations for content access.

Embodiment Number 26

The Tuner Platform Client does not manipulate content made available.

Embodiment Number 27

The content server, if applicable, and upload or download content at will.

Embodiment Number 28

The tuners access to view or listen to the actual amount of content files that are available for use by The Digital TV Tuner Regulator Platform Client designee's.

Embodiment Number 29

The storage unit is activated each time a unique user activates it's unique The Digital TV Tuner Regulator Platform Client.

Embodiment Number 30

The content on each respective The Digital TV Tuner Regulator Platform Client pre-programmed preferences (all preferences are stored in the trigger database or storage unit) that the user programmed his or her The Digital TV Tuner Regulator Platform Client with so it is ready to deliver choice of advertisements or stand alone advertisements based on those same users preferences.

Embodiment Number 31

Ads are displayed to the user before, after, or during the time a user requests content. The user shall have the choice to pick which ad selections they desire from any number of options of actual advertisements.

Embodiment Number 32

Digital Client recognizes and reports to the Digital TV Tuner Regulator Platform advertisements that are new or old and is able to determine if a user has or has not viewed or listened to a specific advertisement. The Digital TV Tuner Regulator Platform Client will only allow or pre select advertisements that the user has not viewed or listened to.

Embodiment Number 33

The Digital TV Tuner Regulator Platform Client to accept advertisements already viewed by the user.

Embodiment Number 34

The Tuner Platform Client acknowledges when the advertisement is played, allowing the content to be received by the user. (downloaded, uploaded)

Embodiment Number 35

The Tuner Platform Client acknowledges that content may be broken into numerous parts, segments or electric chunks. The Digital TV Tuner Regulator Platform Client is capable of recognizing where commercials are to be added or deleted before, during or after the content download. The Digital TV Tuner Regulator Platform Client also can provide advertisement inserts if the user of the Digital TV Tuner Regulator Platform Client is active, the TV is on, and the same user is either playing, transferring, or exchanging content or real time conferencing.

Embodiment Number 36

On display in it's entirety (or before), royalty payment is audited, logged and reported by the Digital TV Tuner Regulator Platform Client to the Digital TV Tuner Regulator Platform for auditing purposes.

Embodiment Number 37

The Digital TV Tuner Regulator Platform technology will ALSO deliver a computerized link, coupon, or special notice regarding the advertisement the user just viewed to a designated memory area in the TV or TV storage unit or hard drive. This can also be delivered in real time or via email for example. The coupon is sent to the TV Tuner (computer TV or any other applicable device that is capable of storing coupons or computerized links) storage unit, where applicable, for the user to use the coupon to shop online, or at brick and mortar storefronts. Direct response medium could never be more "direct."

Embodiment Number 38

That advertisements will be viewed, but will also be able to provide the consumer with a direct response tool by way of the coupon for extra value for their advertising dollar.

Embodiment Number 39

Block electronic access* to the advertisement server for auditing purposes.
(*via computer, Internet, TV Unit, etc)

Embodiment Number 40

An advertisement server can view how many advertisements they have in the system.

Embodiment Number 41

An advertisement server can view in real time the amount of times advertisements are viewed. This is not limited to the time, date.

Embodiment Number 42

An advertisement server can view in real time the dates and times advertisements were played.

Embodiment Number 43

An advertisement server can view in real time the content that was actually selected in order for the actual advertisements to be played.

Embodiment Number 44

An advertisement server can view in real time where the advertisements were played.(the demographics of the unique regulator device/user)

Embodiment Number 45

Advertisers upon access to the advertisement server may view the advertisements that were least popular with users.

Embodiment Number 46

An advertisement server may add money to their respective accounts to assure advertisements run consecutively w/o interruption of service.

Embodiment Number 47

An advertisement server may regulate what user The Digital TV Tuner Regulator Platform Client will be able to view advertisements. They can set age, race and demographic preferences, for example, if they desire.

Embodiment Number 48

An advertisement server may set which desired rate they desire to pay, or they shall have the ability to "bid" for placement of an advertisement with other advertisers. For example, if a new TV show is out, or video is on the streets, and the Digital TV Tuner Regulator Platform ADMINISTRATOR knows there will be a consumer demand, can set up a bidding atmosphere where advertisers bid to place their respective advertisements on the front line when the consumer actually selects or demands the content which is the form of a new TV show or video (examples).

Embodiment Number 49

The Digital TV Tuner Regulator Platform Client, again, is programmed by each individual user's preferences. If a user prefers, for example, advertisements in Spanish, the advertisement server shall provide a Spanish advertisement instead of the advertisement being in, for example, English.

Embodiment Number 50

An advertisement server can upload or download specific advertisements .i.e.: art advertisements, audio commercials, video commercials, multi-media, live or pre-recorded. Having power to upload and download advertisements allows for advertisers to keep up with specific ad campaigns, for example.

Embodiment Number 51

Ads go do with the advertisers preferences and how they desire the user or solicit the user. They are however, assured that their advertisement will be viewed before, during or after the content reach the end user with a unique The Digital TV Tuner Regulator Platform Client.

Embodiment Number 52

The limit of advertisements they can use. The advertisement server will "code" or designate, or assign a code for each respective advertisement uploaded to the advertisement server by a participating advertiser.

Embodiment Number 53

Add The V Tuner Regulator Platform Administrators will be able to access the number of advertisements played, which specific advertisements were most and least popular, times and dates of advertisements played, the demographics of the users that selected the ad's played to rank popularity, upload payments for advertising within the Digital TV Tuner Regulator Platform, and what content was used for their advertisement.

Embodiment Number 54

Ads fees deducted from the participating advertisers account when an advertisement is played and the Trigger logs the advertisement "use." The Digital TV Tuner Regulator Platform Client reports this information to the auditing server. The Auditing serves and accumulates all the information activities from which each unique The Digital TV Tuner Regulator Platform Client user. Frequency of use, times and dates.

Embodiment Number 56

The ability to audit each user when the user "logs" in or activates his or her unique "client". This is information is saved to a) show times, b) dates, and c) frequency.

Embodiment Number 57

The edits requested content for each "client" assigned with each unique user.

Embodiment Number 58

The edits the owners of the requested content.

Embodiment Number 59

The edits the demographics of each "client" user that requests content.

Embodiment Number 60

The edits the date, time and frequency of content requested per "client."

Embodiment Number 61

The Auditing server/device audits the information regarding the users platform used to receive, download or upload the content. (Type of TV, Computer, etc)

Embodiment Number 62

The Auditing server/device audits the use of each respective content type and the form the content is delivered.

Embodiment Number 63

The edits the amount of transfers, exchanges and downloads of content.

Embodiment Number 64

The edits each users advertising preferences.

Embodiment Number 65

Audits the advertisements played.

Embodiment Number 66

The edits the amount of unique "user" views for each respective advertisement.

Embodiment Number 67

The edits the owners of the advertisements who participate in this advertising invention.

Embodiment Number 68

The edits the demographics of each advertiser and their specific user "audience."

Embodiment Number 69

The edits the date, time and frequency of use of EACH unique advertisement.

Embodiment Number 70

The edits the users use of coupons provided by the advertising server. (see Embodiment number 37, 38)

Embodiment Number 71

The Auditing server/device audits the information regarding the royalties paid or accumulated and paid, in real time.

Embodiment Number 72

The edits the use of each respective advertisement type (audio, image, banner, video, animation, etc).

Embodiment Number 73

The edits the amount of transfers, exchanges and downloads of advertisements.

Embodiment Number 74

The system cumulates royalties and prepares for the distribution of royalties.

Embodiment Number 75

The payment activity of each specific content owner.

Embodiment Number 76

The capable of preparing federal and state tax forms as it relates to reporting royalty revenues to the proper government authorities.

Embodiment Number 78

The capable of printing checks for the fulfillment royalty distribution.

Embodiment Number 79

The capable of connect itself with content owner banking accounts to allow for secure transfer of funds for the fulfillment royalty distribution The Tuner Platform has a main user database (or information storage unit). This is a database of users each with unique The Digital Tuner Regulator Platform Client. The Digital Tuner Regulator Platform Client regulate and act differently for each profile a user creates, is 100% different from the rest of the users. Each user is unique and authenticated. Each user can update their profiles up to the minute or daily thanks to the Digital Tuner Regulator Platform and It's Client.

The Tuner Platform Client is either assigned, downloaded, or pre installed on devices or TV's that are made equipped with a Digital Tuner. This invention is not limited to working with TV's that receive content through a cable tv box, a satellite box first before the content "signals" reach the TV. Each Digital Tuner Regulator Platform Client is then "programmed" with input based on personal preferences, demographics, desires, age, of each user and more. Once the Digital Tuner Regulator Platform is programmed with each unique users "Client" the Digital Tuner Regulator Platform is assigns each unique user with their own "Client" which then regulates processes, for which this is invention is made.

The Tuner Platform Client is "activated" only when a user turns on the TV, or opens up the software for use containing the unique The Digital Tuner Regulator Platform Client. The user's "use" is when the user desires to receive, download, play or exchange content.

The Tuner Platform Client is responsible for regulating the content requested. The Digital Tuner Regulator Platform Client is also responsible for providing advertisements to the user so the user may select his or her own advertisement based on the preferences they program each client with and at the same time accounting for the royalty fulfillment for the use of the content.

The Tuner Platform Client regulates the information accumulated throughout the users any given moment of activity. The Digital Tuner Regulator Platform Client recognizes the "age" of a user, thus prohibiting the user, if under legal age, access to content that is meant for adults, or over a certain age.

The Tuner Platform Client works within a secure atmosphere. All content requests, transfers, advertisement requests and deliverables, as well as royalty distribution all occurs within this closed matrix.

The Tuner Platform Client components can also recognize and accept credit card payment, check payments, and allow for the real time auditing of a users activity and purchase history. The Digital Tuner Regulator Platform Client keeps track of the activity of the user and reports this information to the numerous components that drive this invention.

The Tune Platform Client can be installed on either the users digital tuner equipped device or TV (or computer that provides TV content. i.e.: audio or video) or the both the users TV (or computer that provides TV content. i.e.: audio or video) and the entity that uses the trigger technology on the back end for user interactivity. The Digital Tuner Regulator Platform Client regulates the processes that make up this invention. (s) The Digital Tuner Regulator Platform processes must work together (OR STAND ALONE) to authenticate users, content, advertisement, and royalty distribution.

The Tuner Platform works with all current and future platforms that distribute content. The Digital Tuner Regulator Platform Client recognizes reports back to the The Digital Tuner Regulator Platform the user, the times of user activity, content type (audio, video, gaming, art, live broadcast, streamed broadcast, etc), name of the content, when it was entered or made available to users, the amount of times content has been used or transferred, the advertisement options, what advertisement the viewer has or has not selected to view in order to not send the user "repeat" advertisements, the amount of royalties paid for the users "use" of content, etc:

The Tuner Platform Client is able to read and recognize if a person or TV platform is equipped with a The Digital Tuner Regulator Platform Client receiver or device. The technological platform that the Digital Tuner Regulator Platform Client regulates for is one where the Digital Tuner Regulator Platform Client will know if a TV, hard drive, or storage unit has been equipped with it's own unique The Digital Tuner Regulator Platform Client. If the other TV or tuner equipped device does not a Digital TV Tuner equipped TV, The Digital Tuner Regulator Platform Client blocks the content being distributed to the other user. The Digital Tuner Regulator Platform Client then is capable of sending the person who does not have a device or TV equipped with a digital tuner to a designated area to get a The Digital Tuner Regulator Platform Client in order to be part of the Digital Tuner Regulator Platform.

The Tuner Platform Client can also be regulated by the content owners. Content owners "program" the DTR platform to allow content to be used or made available to users with The Digital Tuner Regulator Platform Clients. Likewise, The Digital Tuner Regulator Platform Client also recognizes when a content owner does desire specific content to be used by other The Digital Tuner Regulator Platform users. Content owners also have the ability to block advertisements they do not desire to be "associated" with their content.

The content is sourced as soon as a user activates his or her The Digital Tuner Regulator Platform Client.

Content owners may insert content which is Digital Rights Management based or non-protected files. (files embedded with codes or "instructions" that cover actual usage, etc.) They may make available content with just an advertisement(s) for payment for use of content or they may desire advertisement(s) and payment for the use of content. Content could be in the form of new and old tv shows, video's, live broadcasts, art, pictures, conferencing, interactive tv, gaming, music, etc.

The Digital Tuner Regulator Platform plug's into existing digital media. From existing peer to peer platforms made for Digital Tuner TV, TV's or Computer TV's and TV/Computer Storage Units, "Streaming" Platforms made for TV or Computer TV's and TV/Computer Storage Units, Live Broadcast Platforms made for TV or Computer TV's and TV/Computer Storage Units, Wireless Platforms (in any shape. i.e.: peer to peer), UHF/VHF Platforms made for TV's or Computer TV's and TV/Computer Storage Units, Satellite and Cable Company Platforms/Boxes made for TV or Computer TV's and TV/Computer Storage Units.

The DTR Platform will not begin transporting content to the end user until the end user selects an advertisement to view to begin transfer of content to the users a TV platform or tuner equipped device, or storage unit for later use of the actual content. Advertisement can or can't be played during and after advertisement selection has transpired. In short, the user must select an advertisement or pay for the content before the content is delivered to the end user. The payment can or can't be in combination of the actual advertisement selection by the end user. Content is always accounted for. A content file is never allowed access to an end user unless a payment is registered by way of advertisement or payment or combined. Digital Tuner Regulator Platform Client logs and reports all this information.

The Tuner Platform Client invention can select content from various sources at once and in tandem with other The Digital Tuner Regulator Platform Clients. When the user activates his or her own unique Regulator Client, the content server is locked into each Regulator Client that is active so the user may be able to access content. Two main sources the content will be available from: a) It could work all "in-house" with a content delivery platform already assembled that a user with a Regulator Client" has access to. Or, for example, if an entity desires use of the Digital Tuner Regulator Platform Client Technology to regulate their own content already existing on other technological platforms, a "Regulator Platform" bridge will be installed in between the trigger technology and the content available to those users with triggers.

Content owners upon access to the content storage unit will be able to insert in real time, via the internet or any other electronic device, content into a The Digital Tuner Regulator Platform regulated content server at will.

The Digital Tuner Regulator Platform storage unit can also eliminate the availability of content to people.

The content storage unit can or can't set usage rates for the content.

The Tuner Regulator Platform Client shall audit all the information the content owner needs to regulate and profit from content use.

The content storage unit can view in real time the usage of each of their respective content offerings. Daily, up to the minute, monthly, year to date.

The content storage unit can view how much money has been paid in royalties for the use of their content.

The content storage unit can view how many "unique" files they have made available to users. This includes the title or name of the content, etc.

Servers or components that are combined together in various separate locations for content access.

The Tuner Platform Client does not manipulate content made available.

The content server, if applicable, and upload or download content at will.

The users can access to view or listen to the actual amount of content files that are available for use by The Digital Tuner Regulator Platform Client designee's.

The storage unit is activated each time a unique user activates it's unique The Digital Tuner Regulator Platform Client.

The Digital Tuner Regulator Platform Client pre-programmed preferences jail preferences are stored in the trigger database or storage unit) that the user programmed his or her The Digital Tuner Regulator Platform Client with so it is ready to deliver choice of advertisements or stand alone advertisements based on those same users preferences.

Follow on Ad's are determined for the user before, after, or during the time a user requests content. The user shall have the choice to pick which ad selections they desire from any number of options of actual advertisements.

The Digital Tuner Regulator Platform Client recognizes and reports to the Digital Tuner Regulator Platform advertisements that are new or old and is able to determine if a user has or has not viewed or listened to a specific advertisement. The Digital Tuner Regulator Platform Client will only allow or pre select advertisements that the user has not viewed or listened to.

The Digital Tuner Regulator Platform Client can or cannot offer and accept advertisements already viewed by the user.

The Platform Client acknowledges when the advertisement is played, allowing the content to be received by the user. (downloaded, uploaded)

The Platform Client acknowledges that content may be broken into numerous parts, segments or electric chunks. The Digital Tuner Regulator Platform Client is capable of recognizing where commercials are to be added or deleted before, during or after the content download. The Digital Tuner Regulator Platform Client also can provide advertisement inserts if the user of the Digital Tuner Regulator Platform Client is active, the TV is on, and the same user is either playing, transferring, or exchanging content or real time conferencing.

Once content is used in its entirety (or before), royalty payment is audited, logged and reported by the Digital Tuner Regulator Platform Client to the Digital Tuner Regulator Platform for auditing purposes.

The Digital Tuner Regulator Platform technology will ALSO deliver a computerized link, coupon, or special notice regarding the advertisement the user just viewed to a designated memory area in the TV or TV storage unit or hard drive. This can also be delivered in real time, or via email for example. The coupon is sent to the TV Tuner (computer TV or any other applicable device that is capable of storing coupons or computerized links) storage unit, where applicable, for the user to use the coupon to shop online, or at brick and mortar storefronts. Direct response medium could never be more "direct."

This that advertisements will be viewed, but will also be able to provide the consumer with a direct response tool by way of the coupon for extra value for their advertising dollar.

The advertisement server can view how many advertisements they have in the system.

The advertisement server can view in real time the amount of times advertisements are viewed. This is not limited to the time, date.

The advertisement server can view in real time the dates and times advertisements were played.

The advertisement server can view in real time the content that was actually selected in order for the actual advertisements to be played.

The advertisement server can view in real time where the advertisements were played. (the demographics of the unique regulator device/user) Advertisers upon access to the advertisement server may view the advertisements that were least popular with users.

The advertisement server may add money to their respective accounts to assure advertisements run consecutively w/o interruption of service.

The advertisement server may regulate what user The Digital Tuner Regulator Platform Client will be able to view advertisements. They can set age, race and demographic preferences, for example, if they desire.

The advertisement server may set which desired rate they desire to pay, or they shall have the ability to "bid" for placement of an advertisement with other advertisers. For example, if a new TV show is out, or video is on the streets, and the Digital Tuner Regulator Platform ADMINISTRATOR knows there will be a consumer demand, can set up a bidding atmosphere where advertisers bid to place their respective advertisements on the front line when the consumer actually selects or demands the content which is the form of a new TV show or video (examples).

The Digital Tuner Regulator Platform Client, again, is programmed by each individual user's preferences. If a user prefers, for example, advertisements in Spanish, the advertisement server shall provide a Spanish advertisement instead of the advertisement being in, for example, English.

The advertisement server can upload or download specific advertisements. i.e.: art advertisements, audio commercials, video commercials, multi-media, live or pre-recorded. Having power to upload and download advertisements allows for advertisers to keep up with specific ad campaigns, for example.

The system records the advertisers preferences and how they desire the user or solicit the user. They are however, assured that their advertisement will be viewed before, during or after the content reaches the end user with a unique The Digital Tuner Regulator Platform Client.

There is no limit of advertisements they can use. The advertisement server will "code" or designate, or assign a code for each respective advertisement uploaded to the advertisement server by a participating advertiser.

The Tuner Regulator Platform Administrators will be able to access the number of advertisements played, which specific advertisements were most and least popular, times and dates of advertisements played, the demographics of the users that selected the ad's played to rank popularity, upload payments for advertising within the Digital Tuner Regulator Platform, and what content was used for their advertisement.

Information is deducted from the participating advertisers account when an advertisement is played and the Trigger logs the advertisement "use." The Digital TV Tuner Regulator Platform Client reports this information to the auditing server.

The Auditing services and accumulates all the information activities from which each unique The Digital Tuner Regulator Platform Client user. Frequency of use, times and dates.

The system serves to audit each user when the user "logs" in or activates his or her unique "client". a) This is information is saved to show times, b) dates, and c) frequency.

The system edits requested content for each "client" assigned with each unique user.

The system edits the owners of the requested content.

The system edits the demographics of each "client" user that requests content.

The system edits s the date, time and frequency of content requested per "client."

The Auditing server/device audits the information regarding the users platform used to receive, download or upload the content. (type of TV, Computer, etc)

The Auditing server/device audits the use of each respective content type and the form the content is delivered.

The system edits s the amount of transfers, exchanges and downloads of content.

The system edits s each users advertising preferences

The system edits the advertisements played.

The system edits the amount of unique "user" views for each respective advertisement.

The system edits the owners of the advertisements who participate in this advertising invention.

The system edits the demographics of each advertiser and their specific user "audience."

The system edits the date, time and frequency of use of EACH unique advertisement.

The system edits the users use of coupons provided by the advertising server.

The Auditing server/device audits the information regarding the royalties paid or accumulated and paid, in real time.

The system edits the use of each respective advertisement type (audio, image, banner, video, animation, etc)

The system edits the amount of transfers, exchanges and downloads of advertisements.

The system accumulates royalties and prepares for the distribution of royalties.

The system records payment activity of each specific content owner.

The system is capable of preparing federal and state tax forms as it relates to reporting royalty revenues to the proper government authorities.

The system is capable of printing checks for the fulfillment royalty distribution.

The system is capable of connect itself with content owner banking accounts to allow for secure transfer of funds for the fulfillment royalty distribution Technology is unique from all Digital Tuner TV/Internet Platforms, cable and interactive tv technology. This technology allows for each user to be also be uniquely authenticated (different from the rest), content to be selected and tracked by the user and delivered to the user, all the while the user actually selecting their own unique advertisement while allowing real time control to remain with not only the content owners and the advertisers, but the users as well. The processes also allow for real time inventory auditing. The invention also provides an around the clock auditing system to track content, user activity, commercial usage. users being consumers) All processes are stand alone or work together. Current technologies do not allow consumers to actually select the "commercial" they desire to be solicited with, at the same time being able to select the content they desire to use.

Content owners are able to add and delete commercials for users that desire to see their advertisement. Content owners are able to track results of their content usage and popularity. The technology can act as a self supporting stand alone platform or an intermediary to current distribution platforms such as: satellites, cable tv, wireless tv and peer to peer platforms. Tv reception or download units include regular box TV's, Digital Tuner Equipped TV's, Digital Tuner Equipped TV's equipped or that allows for "plug and play" storage units or hard drives, PC's or Computers that are turned into TV's, Computers hooked into TV's or Digital Tuner Equipped TV's, HDTV TV units with Digital Tuners, Pocket PC's and TV's, Plasma TV's, Handicapped Equipped TV's, but are not limited to video game console's that are able to transport and receive digital signals that could be played or used with a digital tuner equipped tv, commercial/"re-play" skipping devices, cable ready TV's, internet ready TV's, internet ready tv hand devices, wireless devices that transport Tv related content.

This technology does not work in one single language, but multiple languages in order to better provide parity for language demographics. That allows for TV broadcaster, advertiser to deliver content to the most diverse audience ever assembled. This technology could also be used by current TV related businesses that do not allow the consumer to select content or advertisements on-demand. Tv Broadcasters and Cable Operators could decide which programming to show as well as which advertisement they desire their users to see based on their preference profile which is stored in the Digital Tuner Regulator Platform invention.

I claim:

1. A process comprising a user system that includes a client platform connected to a two-way digital tuner equipped device, said client platform regulating processes that authenticate users, content, advertisement and royalty distribution, and said client platform recognizing and reporting to a server platform the following information: data about the user, the times of user activity, a content type, the name of said content, the time that said content was made available to users by the owner of the content, the number of times said content has been used by or transferred to or among the users, advertisement consumption options, which advertisement the user has or has not selected in the past, which advertisement that the user has or has not seen, the amount of royalties paid, and to whom said royalties were paid, where user must watch advertising to see the content where said users can have a preference in the advertising that they watch and where the user system assigns a unique code for each respective advertisement uploaded by a participating advertiser.

2. A process according to claim 1 wherein said client platform further controls one or more of the following processes: a selection or non-selection of content, a selection or non-selection of ads, playing content, or storing content.

3. A process according to claim 1 further comprising generating said client platform for each unique user.

4. A process according to claim 1 further comprising having said information being stored in one or more databases, APIs or storage units, and for which said information is controlled by the actions of said user's input into said user system.

5. A process according to claim 4 wherein said database is contained within said user system.

6. A process according to claim 1 wherein said user system is a television receiver.

7. A process according to claim 1 wherein said user system is a computer.

8. A process according to claim 1 wherein said user system comprises a set top box connected to a display device.

9. A process according to claim 1 wherein said user system informs the advertiser of the advertisement viewed and amount viewed by the user.

10. A process according to claim 9 wherein said advertiser uses the information of the advertisement viewed and amount viewed to decide on what advertisement is viewed by the user.

11. A process according to claim 1 further comprising having content not cached for future use.

* * * * *